US011886708B2

(12) United States Patent
Wu

(10) Patent No.: US 11,886,708 B2
(45) Date of Patent: Jan. 30, 2024

(54) FAST MODE FOR A MEMORY DEVICE

(71) Applicant: Micron Technology, Inc., Boise, ID (US)

(72) Inventor: Minjian Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 69 days.

(21) Appl. No.: 17/051,113

(22) PCT Filed: Nov. 20, 2019

(86) PCT No.: PCT/CN2019/119708
§ 371 (c)(1),
(2) Date: Oct. 27, 2020

(87) PCT Pub. No.: WO2021/097711
PCT Pub. Date: May 27, 2021

(65) Prior Publication Data
US 2023/0342033 A1    Oct. 26, 2023

(51) Int. Cl.
G06F 12/00 (2006.01)
G06F 3/06 (2006.01)
G06F 12/02 (2006.01)

(52) U.S. Cl.
CPC .......... G06F 3/0611 (2013.01); G06F 3/0634 (2013.01); G06F 3/0679 (2013.01);
(Continued)

(58) Field of Classification Search
CPC .... G06F 3/0611; G06F 3/0634; G06F 3/0679; G06F 12/0246; G06F 2212/7201; G06F 2212/7205
See application file for complete search history.

(56) References Cited

U.S. PATENT DOCUMENTS 7,024,547 B2    4/2006  Kartoz
8,112,575 B2 *  2/2012  Nakanishi ........... G06F 12/0246
                                                           711/170
(Continued)

FOREIGN PATENT DOCUMENTS

CN    1508651 A    6/2004
CN  102693136 A    9/2012
(Continued)

OTHER PUBLICATIONS

Chinese Patent Office, "Office Action," issued in connection with CN Patent Application No. 201980102348.2, dated Jun. 10, 2023 (16 pages total; 8 pages original and 8 pages translation).

(Continued)

Primary Examiner — John A Lane
(74) Attorney, Agent, or Firm — Holland & Hart LLP

(57) ABSTRACT

Methods, systems, and devices for fast mode for a memory device are described. In some examples, a memory device may be initialized during a system boot procedure. The memory device may support multiple modes of operation, including at least a first mode that includes a first set of capabilities, and a second made that includes the first set of capabilities, as well as one or more additional capabilities. The memory device may perform the initialization while operating the memory device according to the first mode, which may include delaying one or more actions associated with the one or more additional capabilities. After the system boot procedure is complete, the memory device may operate according to the second mode, which may include performing an action delayed during the system boot.

25 Claims, 10 Drawing Sheets

(52) U.S. Cl.
CPC .. *G06F 12/0246* (2013.01); *G06F 2212/7201* (2013.01); *G06F 2212/7205* (2013.01)

(56) References Cited

U.S. PATENT DOCUMENTS

| | | |
|---|---|---|
| 2004/0006690 A1 | 1/2004 | Du et al. |
| 2010/0174866 A1 | 7/2010 | Fujimoto et al. |
| 2012/0089826 A1* | 4/2012 | Ugokwe ................ G06F 13/10 713/2 |
| 2014/0344502 A1 | 11/2014 | Hsu et al. |
| 2014/0344620 A1 | 11/2014 | Ma et al. |
| 2015/0317094 A1* | 11/2015 | Elhamias .............. G06F 3/0679 711/103 |
| 2016/0232057 A1* | 8/2016 | Star ...................... G06F 9/4408 |
| 2017/0031763 A1* | 2/2017 | Pan ...................... G06F 3/0611 |
| 2017/0039075 A1 | 2/2017 | Li et al. |
| 2018/0373629 A1* | 12/2018 | Kim ..................... G06F 3/0632 |
| 2019/0220228 A1* | 7/2019 | Kim ..................... G06F 3/0605 |

FOREIGN PATENT DOCUMENTS

| | | |
|---|---|---|
| CN | 103425506 A | 12/2013 |
| CN | 109254798 A | 1/2019 |

OTHER PUBLICATIONS

International Search Report and Written Opinion received for PCT Patent Application No. PCT/CN2019/119708, dated Aug. 19, 2020, 7 pages.

* cited by examiner

_US 11,886,708 B2_

FAST MODE FOR A MEMORY DEVICE

CROSS REFERENCE

The present application for patent is a 371 national phase filing of International Patent Application No. PCT/CN2019/119708 by W U et al., entitled "FAST MODE FOR A MEMORY DEVICE," filed Nov. 20, 2019, assigned to the assignee hereof, and expressly incorporated by reference herein.

BACKGROUND

The following relates generally to a system that includes at least one memory device and more specifically to fast mode for a memory device.

A system may include various kinds of memory devices and controllers that are coupled via one or more buses to manage information in numerous electronic devices such as computers, wireless communication devices, internet of things, cameras, digital displays, and the like. Memory devices are widely used to store information in such electronic devices. Information is stored by programing different states of a memory cell. For example, binary memory cells may store one of two states, often denoted by a logic "1" or a logic "0." Some memory cells are capable of storing one of more than two states. To access the stored information, the memory device may read, or sense, the stored state in the memory cell. To store information, the memory device may write, or program, the state to the memory cell.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), Flash memory (such as floating-gate Flash and charge-trapping Flash, which may be used in not-or (NOR) or not-and (NAND) memory devices), and others. Memory devices may be volatile or non-volatile. Non-volatile memory cells, e.g., such as Flash memory cells, may maintain their stored logic state for extended periods of time even in the absence of an external power source. Volatile memory cells, e.g., DRAM cells, may lose their stored state over time unless they are periodically refreshed by an external power source. Flash-based memory devices may have improved performance compared to some non-volatile and volatile memory devices.

DETAILED DESCRIPTION

Figure 1:
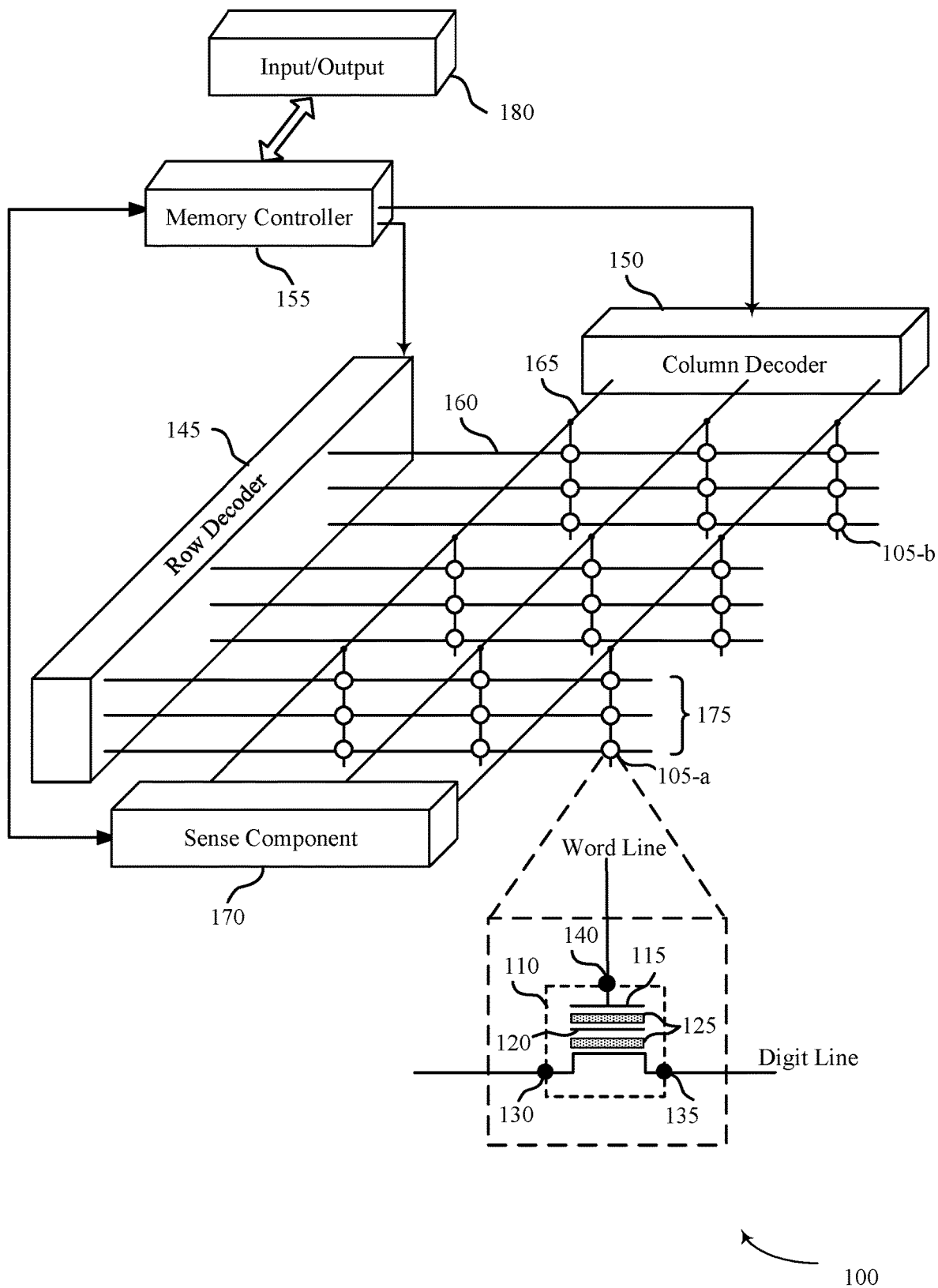
FIG. 1 illustrates an example of a memory device that supports a fast mode for a memory device in accordance with examples as disclosed herein.

For some electronic systems, reducing an amount of time required for the system to be available after a system boot procedure (e.g., power on of the system) may be beneficial. For example, some electronic automotive systems, including safety critical systems, may subject to requirements that define a maximum time for the system to be available after a system boot procedure. As one such example, some systems (e.g., an advanced driver-assistance system (ADAS)) of an automobile may require that a back-up camera be ready within about 1.0 or 1.2 seconds or less from power on of the backup camera. Many such systems require memory devices for operation. The time requirements may include time for such memory devices (e.g., a managed NAND memory device) to perform certain processes, such as initializing the memory device, making data ready from the memory device, etc. For example, the system may require that the memory device for the backup camera return initial screen data for the automobile within about 0.5 seconds or less from the start of power on of the system.

As another example, a system (e.g., a system conforming to the controller area network (CAN) specification) may require that a memory device provide data to a gateway of a domain control gateway within about 2.0 seconds or less. The system may require that the gateway operating system (OS) and drivers be loaded within about 2.0 seconds or less. As such, a memory device may need to perform initialization and read operations within about 0.6 seconds or less.

During a system boot procedure, a memory device may perform operations that take a relatively large time, for example due to big managed input/output latencies for a NAND memory device. On such latency is during a managed NAND initialization, when a system block, or a mapping table block, or both, may be refreshed. This refresh may take about several hundred milliseconds, increasing the initialization time by several hundred milliseconds. Another example of such latency is during a read operation, when refreshing the read disturb block to a new block may increase the read latency of the memory device. Yet another example of such latency is during a write operation, when foreground garbage collection may be trigger, increasing a write latency time.

In order to decrease latency, some systems may implement heterogenous memory devices. For example NOR memory devices may be faster (e.g., having a lower read time) than comparable NAND memory devices. In one example, a system may implement NOR devices as a system booting device, and implement managed NAND devices for data storage. However, a system having heterogenous memory devices may be associated with increased cost and complexity of the system.

Techniques that reduce latency for a memory device, for example during system boot such as booting an electronic automotive system, are described herein. A memory device may support multiple modes, where a first mode (e.g., a fast mode) may include a set of capabilities, and a second mode (e.g., a normal or standard mode) may include the set of capabilities together with one or more additional capabilities. During a system boot procedure, the memory device may be initialized, and operate according to the first mode (fast mode). Operation according to the first mode may allow action associated with the set of capabilities (e.g., critical operations for system boot) and delay actions associated with the one or more additional capabilities until after the system boot is complete. For example, the memory device may allow certain initialization, read, or write operations, but suspend, delay, or modify certain other read and write, refresh, or management operations until after the system boot is complete. The memory device may operate in the first mode during initialization as a default mode of operation, or responsive to a received command (e.g., from a memory controller). The memory device may exit the first mode to operate in the second mode responsive to a received command, or if a threshold value is satisfied. By delaying certain actions of the memory device while operating in the first mode until after system boot is complete, a system such as an electronic automotive system may reduce the time required for the system boot, decreasing latency at a lower cost, and improving overall performance of the system.

Features of the disclosure are initially described in the context of a memory device and memory circuit as described with reference to FIGS. 1-3. Features of the disclosure are described in the context flowcharts for processes as described with reference to FIGS. 4-6. These and other features of the disclosure are further illustrated by and described with reference to system diagrams, apparatus diagrams and flowcharts that relate to a fast mode for a memory device as described with references to FIGS. 7-10.

FIG. 1 illustrates an example of a memory device 100 in accordance with examples as disclosed herein. In some cases, the memory device 100 may be referred to as a memory chip, a memory die, or an electronic memory apparatus. The memory device 100 may include one or more memory cells, such as memory cell 105-a and memory cell 105-b (other memory cells are unlabeled). A memory cell 105 may be, for example, a Flash memory cell (such as in the blow-up diagram of memory cell 105-a shown in FIG. 1), a DRAM memory cell, an FeRAM memory cell, a PCM memory cell, or another type of memory cell.

Each memory cell 105 may be programmed to store a logic state representing one or more bits of information. In some cases, a memory cell 105 may store one bit of information at a time (e.g., a logic state 0 or a logic state 1), such as in the memory cells of single-level cell (SLC) memory blocks, which may be referred to as SLC memory cells. In some cases, a single memory cell 105 may store more than one bit of information at a time. Cells that store two bits are sometimes referred to as multi-level cells (MLCs), though this term is sometimes also used to refer to any memory cell that stores more than one bit. Memory cells that store three bits may be referred to as triple- or tri-level cells (TLCs), and memory cells that store four bits may be referred to as quad-level cells (QLCs), etc. Multiple-level cells, such as MLCs, TLCs, and QLCs, may provide cost and/or density advantages relative to SLCs, while SLCs may be faster, and thus associated with a lower latency, and be more reliable than multiple-level cells. In some cases, NAND memory cells may be (e.g., may be configured or operated as) SLCs or as multiple-level cells. In general, the more bits stored in a memory cell, the more sensitive the memory cell may be to noise or other disturbances such as those that may arise under relatively extreme operating conditions, and the longer it may take to store bits to or reads bits from the memory cell. Thus, for example, an SLC may be more robust and faster than a multiple-level cell, but may cost more and provide less density. Similarly, an MLC cell may be faster than a TLC cell, and a TLC cell may be faster than a QLC cell.

A single memory cell 105 in an MLC memory block (e.g., an MLC memory cell) may store two bits of information at a time by storing one of four logic states: logic state 00, logic state 01, logic state 10, or a logic state 11. For example, a single memory cell 105 in a TLC memory block (e.g., a TLC memory cell) may store three bits of information at a time by storing one of eight logic states: 000, 001, 010, 011, 100, 101, 110, 111.

In some cases, a multiple-level memory cell 105 (e.g., an MLC memory cell, TLC memory cell, or QLC memory cell) may be physically different than an SLC cell. For example, a multiple-level memory cell 105 may use a different cell geometry or be fabricated using different materials. In some cases, a multiple-level memory cell 105 may be physically the same or similar to an SLC cell, and other circuitry in a memory block (such as controller circuitry, sense amplifiers, drivers, etc.) may be configured to operate (e.g., read and write) the memory cell as an SLC cell, an MLC cell, a TLC cell, etc.

Different memory cell architectures may store a logic state in different ways. In FeRAM architectures, for example, each memory cell 105 may include a capacitor that includes a ferroelectric material to store a charge and/or a polarization representative of the programmable state. In DRAM architectures, each memory cell 105 may include a capacitor that includes a dielectric material (e.g., an insulator) to store a charge representative of the programmable state.

In Flash memory architectures, each memory cell 105 may include a transistor that has a floating gate and/or a dielectric material for storing a charge representative of the logic state. For example, the blow-up diagram of memory cell 105-a in FIG. 1 is a Flash memory cell that includes a transistor 110 (e.g., a metal-oxide-semiconductor (MOS) transistor) that may be used to store a logic state. The transistor 110 has a control gate 115 and may include a floating gate 120 that is sandwiched between dielectric material 125. Transistor 110 includes a first node 130 (e.g., a source or drain) and a second node 135 (e.g., a drain or source). A logic state may be stored in transistor 110 by placing (e.g., writing, storing) a quantity of electrons (e.g., a charge) on floating gate 120. The amount of charge to be stored on the floating gate 120 may depend on the logic state to be stored. The charge stored on floating gate 120 may affect the threshold voltage of transistor 110, thereby affecting the amount of current that may flow through transistor 110 when transistor 110 is activated. The logic state stored in transistor 110 may be read by applying a voltage to the control gate 115 (e.g., at control node 140) to activate transistor 110 and measuring (e.g., detecting, sensing) the resulting amount of current that flows between the first node 130 and the second node 135.

A sense component 170 may determine whether an SLC memory cell stores a logic state 0 or a logic state 1 in a binary manner, for example, based on the presence or absence of a current from the memory cell, or based on whether the current is above or below a threshold current. For multiple-level cells, however, a sense component 170 may determine the logic state stored in the memory cell based on various intermediate levels of current. For example, a sense component 170 may determine the logic state of a TLC cell based on eight different levels of current (or ranges of current) that define the eight potential logic states that could be stored by the TLC cell. Such levels of current may be fairly closely spaced (in terms of magnitude), providing a lower margin for error than in the SLC case.

Similarly, a Flash SLC memory cell may be written by applying one of two voltages (e.g., a voltage above a threshold or a voltage below a threshold) to the memory cell to store (or not store) an electric charge on the floating gate representing one of the two possible logic states. In contrast, writing to a Flash multiple-level cell may require applying voltages at a finer level of granularity to more finely control the amount of charge stored on the floating gate, thereby enabling a larger set of logic states to be represented. Thus, multiple-level cells may be more sensitive to voltage or current variations that may occur in a memory device due to temperature variations or other operating conditions.

A charge-trapping Flash memory cell may operate in a manner similar to that of a floating-gate Flash memory cell, but instead of (or in addition to) storing a charge on a floating gate 120, a charge-trapping Flash memory cell may store a charge representing the state in a dielectric material below the control gate 115. Thus, a charge-trapping Flash memory cell may or may not include a floating gate 120.

In some examples, each row of memory cells 105 is connected to a word line 160 and each column of memory cells 105 is connected to a digit line 165. Thus, one memory cell 105 may be located at the intersection of a word line 160 and a digit line 165. This intersection may be referred to as a memory cell's address. Digit lines are sometimes referred to as bit lines. In some cases, word lines 160 and digit lines 165 may be substantially perpendicular to one another and may create an array of memory cells 105. In some cases, word lines 160 and digit lines 165 may be generically referred to as access lines or select lines.

In some cases, memory device 100 may include a three-dimensional (3D) memory array, where two-dimensional (2D) memory arrays are formed on top of one another. This may increase the quantity of memory cells that may be placed or created on a single die or substrate as compared with 2D arrays, which in turn may reduce production costs, or increase the performance of the memory array, or both. In the example of FIG. 1, memory device 100 includes multiple levels of memory arrays. The levels may, in some examples, be separated by an electrically insulating material. Each level may be aligned or positioned so that memory cells 105 may be aligned (exactly, overlapping, or approximately) with one another across each level, forming memory cell stack 175. In some cases, memory cell stack 175 may be referred to as a string of memory cells, discussed in more detail with reference to FIG. 2.

Accessing memory cells 105 may be controlled through row decoder 145 and column decoder 150. For example, row decoder 145 may receive a row address from memory controller 155 and activate an appropriate word line 160 based on the received row address. Similarly, column decoder 150 may receive a column address from memory controller 155 and activate an appropriate digit line 165. Thus, by activating one word line 160 and one digit line 165, one memory cell 105 may be accessed.

Upon accessing, memory cell 105 may be read, or sensed, by sense component 170. For example, sense component 170 may be configured to determine the stored logic state of memory cell 105 based on a signal generated by accessing memory cell 105. The signal may include a voltage or electrical current, or both, and sense component 170 may include voltage sense amplifiers, current sense amplifiers, or both. For example, a current or voltage may be applied to a memory cell 105 (using the corresponding word line 160 and/or digit line 165) and the magnitude of the resulting current or voltage on the digit line 165 may depend on the logic state stored by the memory cell 105. For example, for a Flash memory cell, the amount of charge stored on a floating gate or in an insulating layer of a transistor in the memory cell 105 may affect the threshold voltage of the transistor, thereby affecting the amount of current that flows through the transistor in the memory cell 105 when the memory cell 105 is accessed. Such differences in current may be used to determine the logic state stored on the memory cell 105.

Sense component 170 may include various transistors or amplifiers in order to detect and amplify a signal (e.g., a current or voltage) on a digit line 165. The detected logic state of memory cell 105 may then be output via input/output block 180. In some cases, sense component 170 may be a part of column decoder 150 or row decoder 145, or sense component 170 may otherwise be connected to or in electronic communication with column decoder 150 or row decoder 145.

A memory cell 105 may be set or written by similarly activating the relevant word line 160 and digit line 165 to enable a logic state (e.g., representing one or more bits of information) to be stored in the memory cell 105. Column decoder 150 or row decoder 145 may accept data, for example from input/output block 180, to be written to the memory cells 105. As previously discussed, in the case of Flash memory (such as Flash memory used in NAND and 3D NAND memory devices) a memory cell 105 is written by storing electrons in a floating gate or an insulating layer.

Memory controller 155 may control the operation (e.g., read, write, re-write, refresh) of memory cells 105 through the various components, for example, row decoder 145, column decoder 150, and sense component 170. In some cases, one or more of row decoder 145, column decoder 150, and sense component 170 may be co-located with memory controller 155. Memory controller 155 may generate row and column address signals in order to activate the desired word line 160 and digit line 165. Memory controller 155 may also generate and control various voltages or currents used during the operation of memory device 100.

In some cases, memory controller 155 may identify data to write to a memory device 100 that includes memory cells of a first type and memory cells of a second type. For example, memory cells of the first type may be SLC memory cells, and memory cells of the second type may be multiple-level memory cells. For example, memory cells of the first type and memory cells of the second type may be two different types of NAND memory cells.

In some cases, memory controller 155 may operate the memory device 100 according different modes. In a first mode (e.g., a fast mode), the memory controller 155 may be permitted to operate the memory device 100 according to a set of capabilities. In a second mode, the memory controller 155 may operate the memory device according to one or more capabilities in addition to the set of capabilities of the first mode. These modes may provide for reduced operations during the system boot for non-critical operations, while allowing for operations that facilitate the system boot (e.g., are necessary or critical for successful initialization of the memory device as part of the system boot).

During a system boot procedure, memory controller 155 may initialize memory device 100. In some cases, memory controller 155 may receive a command to initialize as part of the system boot procedure. The command to initialize may be received from a system component external to memory device 100 via input/output block 180, such as a host device. In some examples, the memory controller 155 may then identify to operate according to the first mode (e.g., the fast mode) during the system boot. This may be a default configuration for the memory device 100, for example based on a configuration read from firmware as part of initialization of memory device 100. In other examples, memory controller 155 may receive from the host device, via input/output block 180, a command to enter the first mode for initialization during system boot.

Memory controller 155 may write data (e.g., store bits) to a memory device 100 that includes memory cells of a first type and memory cells of a second type. For example, memory cells of the first type may be SLC memory cells, and memory cells of the second type may be multiple-level memory cells. For example, memory cells of the first type and memory cells of the second type may be two different types of NAND memory cells. In some examples, while operating according to the first mode during the system boot, memory controller 155 may store data to a first type of memory cells. After the system boot is complete, memory controller 155 may then store data to both the first type of memory cells and a second type of memory cells. For example, during system boot, memory controller 155 may store data to SLC memory cells, while after system boot is complete, memory controller 155 may store data to MLC memory cells, as well as SLC memory cells. In some cases, the action delayed during system boot for the memory device 100 may be writing to some or all of the MLC memory cells, or other non-SLC memory cells. SLC memory cells may be associated with greater cost, though storing data during initialization of memory device 100 to SLC memory cells may decrease latency. As such, delaying storing data to MLC memory cells until after system boot is complete may allow increased availability of such SLC cells, decreasing system latency, while maintaining lower cost.

Figure 2:
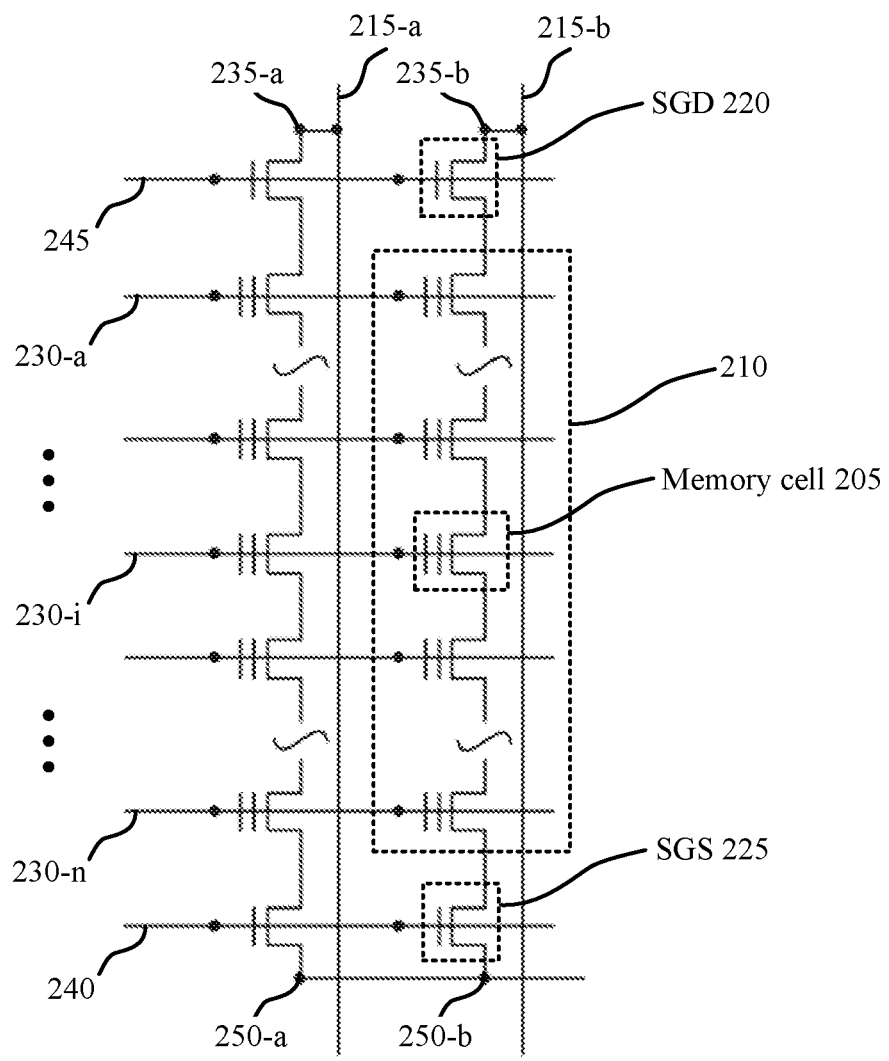
FIG. 2 illustrates an example of a NAND memory circuit that supports a fast mode for a memory device in accordance with examples as disclosed herein.

FIG. 2 illustrates an example of NAND memory circuit 200 that supports a fast mode for a memory device in accordance with examples of the present disclosure. NAND memory circuit 200 may be an example of a portion of a memory device, such as memory device 100. Although some elements included in FIG. 2 are labeled with reference numbers, other corresponding elements are not labeled, though they are the same or would be understood to be similar, in an effort to increase visibility and clarity of the depicted features.

NAND memory circuit 200 includes multiple Flash memory cells 205 (which may be, for example, Flash memory cells such as described with reference to FIG. 1) connected in a NAND configuration. In a NAND memory configuration (referred to as NAND memory), multiple Flash memory cells 205 are connected in series with each other to form strings 210 of memory cells 205, in which the drain of each Flash memory cell 205 in the string 210 is coupled with the source of another Flash memory cell 205 in the string. In some cases, Flash memory cells that are connected in a NAND configuration to form a NAND memory may be referred to as NAND memory cells.

Each string 210 of memory cells 205 may be associated with a corresponding digit line 215 that is shared by the memory cells 205 in the string 210. Each memory cell 205 in a string 210 may be associated with a separate word line 230 (e.g., word line 230-a, 230-i, 230-n), such that the quantity of word lines 230 may be equal to the quantity of memory cells 205 in a string 210.

In general, NAND memory may be hierarchically organized as strings 210 that include multiple memory cells 205, pages that include multiple strings 210, and blocks that include multiple pages. In some cases, NAND memory can be written to and read from at the page level of granularity, but may not be erasable at the page level of granularity. For example, NAND memory may instead be erasable at a higher level of granularity, such as at the block level of granularity. In some cases, a NAND memory cell may need to be erased before it can be re-written. Different memory devices may have different read/write/erase characteristics.

Each string 210 of memory cells 205 in NAND memory circuit 200 is coupled with a select gate device for drain (SGD) transistor 220 at one end of the string 210 and a select gate device for source (SGS) transistor 225 at the other end of the string 210. SGD transistor 220 and SGS transistor 225 may be used to couple a string 210 of memory cells 205 to a bit line 215 and/or to a source node 250 by applying a voltage at the gate 245 of SGD transistor 225 and/or at the gate 240 of SGS transistor 225, respectively.

During NAND memory operations, various voltage levels associated with source node 250, gate 240 of an SGS transistor 225 associated with source node 250, word lines 230, drain node 235, gate 245 of an SGD transistor 220 associated with drain node 235, and bit line 215 may be applied to perform one or more operations (e.g., program, erase, or read) on at least some NAND memory cells in a string 210.

In some cases, during a first operation (e.g., a read operation), a positive voltage may be applied to bit line 215 connected to drain node 235 whereas source node 250 may be connected to a ground or a virtual ground (e.g., approximately 0 V). For example, the voltage applied to drain node 235 may be 1 V. Concurrently, voltages applied to gates 245 and 240 may be increased above the threshold voltages of the one or more SGSs 225 associated with source node 250 and the one or more SGDs 220 associated with drain node 235, such that a channel associated with memory string 210 may be electrically connected to drain node 235 and source node 250. A channel may be an electrical path through the memory cells 205 in a string 210 (e.g., through the transistors in the memory cells 205) that may conduct current under certain operating conditions.

Concurrently, multiple word lines 160 (e.g., in some cases all word lines 160) except a selected word line (i.e., word lines associated with unselected cells in string 210) may be connected to a voltage (e.g., VREAD) that is higher than the highest threshold voltage (VT) of memory cells in string 210. VREAD may cause all of the unselected memory cells in string 210 to turn "ON" so that each unselected memory cell can maintain high conductivity in a channel associated with it. In some examples, a word line 160 associated with a selected cell may be connected to a voltage, VTarget. VTarget may be selected at a value between VT of an erased memory cell and VT of a programmed memory cell in memory string 245. When the selected memory cell exhibits an erased VT (e.g., VTarget>VT of the selected memory cell), the selected memory cell 205 may turn "ON" in response to the application of VTarget and thus allow a current to flow in the channel of memory string 210 from bit line 215 to source node 250. When the selected memory cell exhibits a programmed VT (e.g., hence VTarget<VT of the selected memory cell), the selected memory cell may turn "OFF" in response to VTarget and thus prohibit a current to flow in the channel of memory string 210 from bit line 215 to source node 250. The amount of current flow (or lack thereof), may be sensed by sense component 170 as described with reference to FIG. 1 to read stored information in the selected memory cell 205 within string 210.

Figure 3:
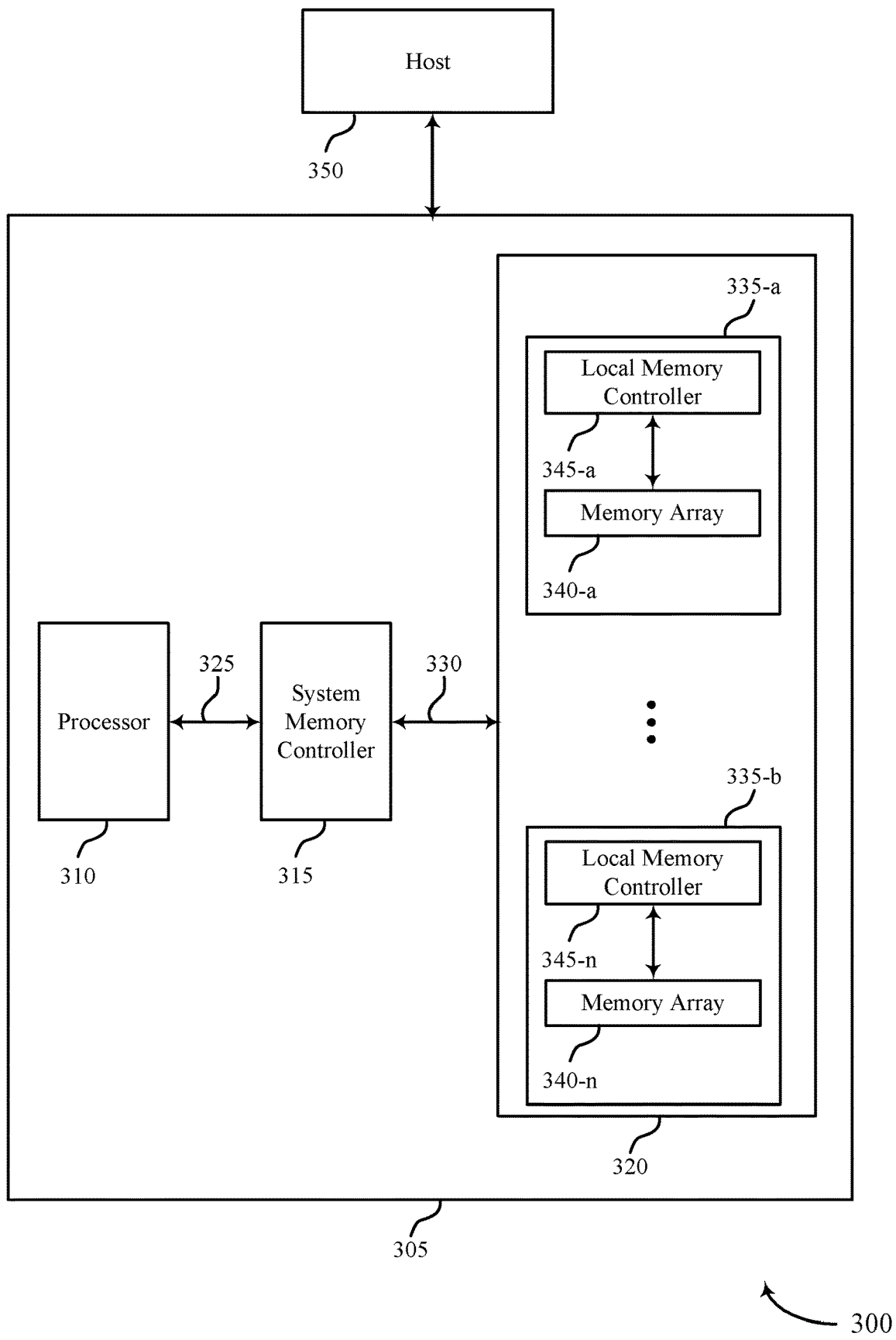
FIG. 3 illustrates an example of a system that supports a fast mode for a memory device in accordance with examples as disclosed herein.

FIG. 3 shows a diagram of a system 300 that supports a fast mode for a memory device in accordance with examples of the present disclosure. System 300 may include a device 305 that may include a processor 310, a system memory controller 315, and a memory device 320. Memory device 320 may be an example of memory device 100, for example. Processor 310 may be configured to operate in coordination with system memory controller 315 via bus 325. System memory controller 315 may be configured to operate with processor 310 and memory device 320 via buses 325, 330.

In some examples, memory device 320 may include one or more memory arrays 340, each of which may be coupled with a corresponding local memory controller 345. In some cases, memory arrays 340 may be arrays of NAND memory cells, for example. In some cases, one or more of the memory arrays 340 may include a first type of memory blocks, and one or more of the memory arrays may include a second type of memory blocks. For example, memory array 340-a may include SLC memory cells, and memory array 340-n may include MLC, TLC, or QLC memory cells. In some cases, at least some of the operations described with reference to FIG. 4, FIG. 5 and/or FIG. 6 may be performed by local memory controllers 345 and/or system memory controller 315. In some cases, device 305 may be coupled with an external host device 350, such as an external memory controller. In some cases, at least some of the operations described with reference to FIG. 4, FIG. 5 and/or FIG. 6 may be performed by host device 350 and/or system memory controller 315.

The local memory controller 345 may be configured to control operations of the memory array 340, for example according to different modes, which may include a first mode (e.g., a fast mode) or a second mode as further described herein. Also, the local memory controller 345 may be configured to communicate (e.g., receive and transmit data and/or commands) with the system memory controller 315. The local memory controller 345 may support the system memory controller 315 to control operation of the memory device 320 as described herein. In some cases, the memory device 320 does not include a system memory controller 315, and the local memory controller 345 and/or a host device 350 may perform one or more of the various functions ascribed herein to the system memory controller 315. As such, the local memory controller 345 may be configured to communicate with other local memory controllers 345, or directly with the host device 350.

Figure 4:
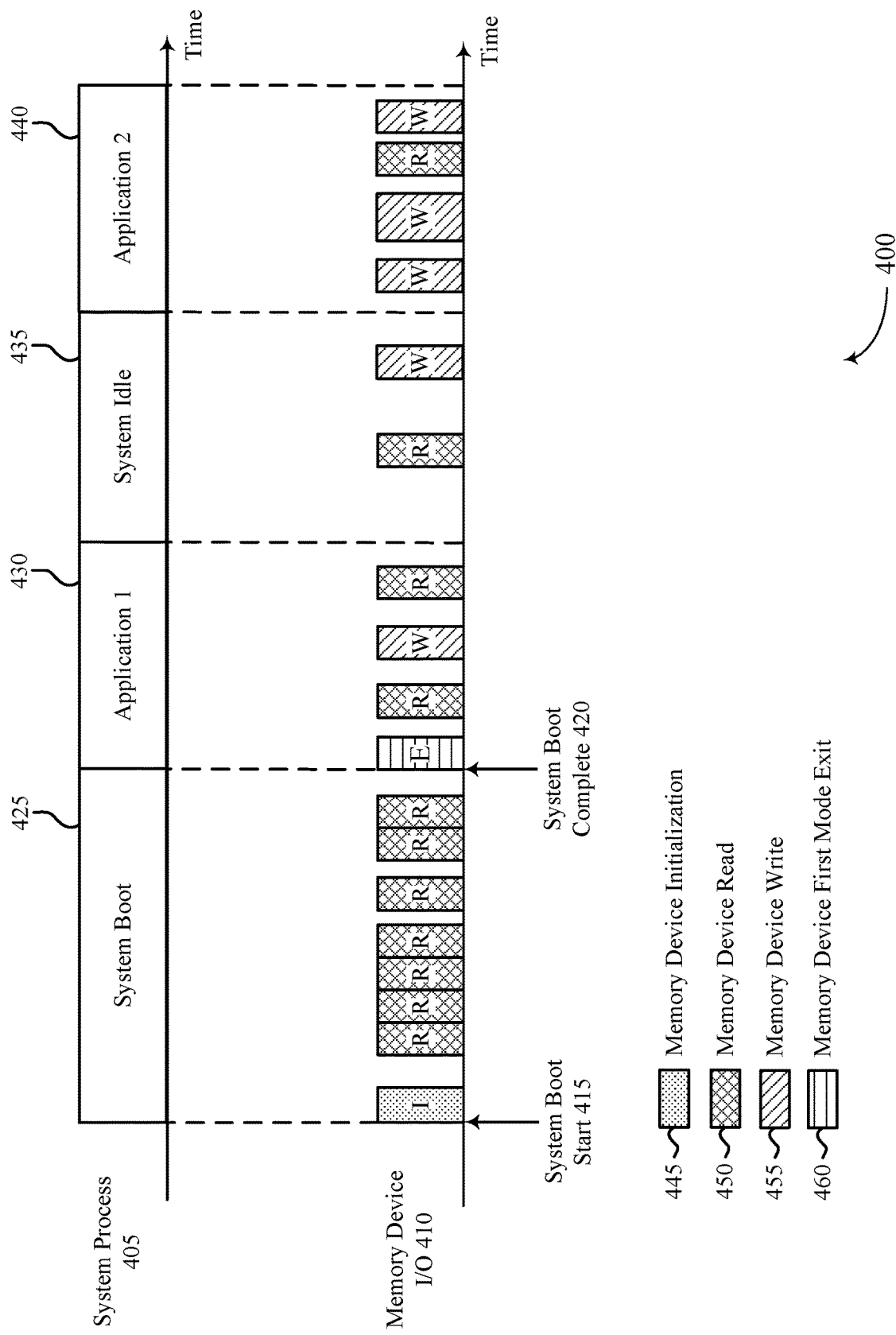
FIG. 4 illustrates an example of a flowchart for a process that supports a fast mode for a memory device in accordance with examples as disclosed herein.

FIG. 4 illustrates an example of a flowchart for a process 400 that supports a fast mode for a memory device in accordance with examples as disclosed herein. Process 400 illustrates a state of a system process 405 over time, and commands at the input/output interface of a memory device (memory device input/output 410).

Processes described as being a system process 405 may represent the processes at a host device of a system that also includes the memory device. In some examples, the host device may be or be part of host device 350, further described with reference to system 300.

Commands described as occurring at memory device input/output 410 may represent commands received or transmitted at input/output block 180 that is coupled with memory controller 155, further described with reference to memory device 100. In some examples, commands described as occurring at memory device input/output 410 may represent commands received or transmitted at memory controller 155 via input/output block 180, further described with reference to memory device 100. In some examples, commands described as occurring at memory device input/output 410 may represent commands received or transmitted at one or more local memory controllers 345 via bus 330, or at system memory controller 315 from host device 350, and/or from processor 310 via bus 325, further described with reference to system 300.

At 415, the system including the host device and memory device, starts a system boot 425. As part of the system boot, the host device may transmit a command for the memory device to initialize (e.g., a memory device initialization command 445). Such initialization may be a managed NAND initialization. The memory device may then enter a first mode of operation, which in some cases may be referred to as a fast mode. The first mode may provide a set of capabilities for the memory device that are, at least in part, selected or configured to optimize a system booting time. For example, the first mode may limit certain capabilities or provide different capabilities than a second mode to speed up input/output operations such as initialization, read, and write. In some cases, the first mode may be optimized to achieve input/output latency that is as low as possible from the memory device (e.g., a managed NAND) while still allowing for a successful system boot. As such, in some examples, the set of capabilities allowed in the first mode may be the minimum capabilities required to perform the system boot at the lowest achievable latency. In other examples, a low latency sufficient to achieve system boot within a certain system boot time may be used, the capabilities selected or configured to achieve the system boot time, but at greater than the minimum time achievable, for example in view of other performance parameters, such as a maximum power or peak current limit. The set of capabilities of the first mode may further be selected to optimize performance for automotive applications.

In some examples, the memory device may operate in the first mode as a default mode of operation for the memory device upon initialization. In some cases, the memory device may be preconfigured with the first mode as the default upon initialization. In other cases, the memory device may be configurable, for example using firmware, to operate in the first mode as the default upon initialization.

In other examples, the memory device may receive a command to enter the first mode, for example from the host device. The command to enter the first mode may be received with or as part of the initialization command. In other examples, the command to enter the first mode may be a separate command from the initialization command. In some examples, the memory device may receive the command to enter the first mode. Usage of the first mode upon system boot or for power on, may be stored or otherwise retained as an attribute of enablement for the memory device. If the system is power cycled (e.g., powered off then rebooted), the first mode may be entered upon initialization of the memory device without or before a command to enter the first mode being received from the host device. In other examples, if the system is power cycled (e.g., powered off then rebooted), the host device may need to transmit a command for the memory device to enter the first mode (e.g., where the attribute is volatile and is lost upon power cycling). Following initialization, the memory device input/output may receive one or more read commands (e.g., memory device read command 450). In some example, such reads may be managed NAND reads. Though six such commands are shown for process 400, any number suitable to effectuate the system boot 425 may be used.

The reads of the memory device during system boot 425 may be some or all of the critical operations required by the system to successfully boot. Latencies (e.g., big input/output latencies for a managed NAND) introduced during system boot 425 may result in the system failing to boot up, booting up in a failed state, or not meeting performance requirements of the system. Input/output latencies (e.g., managed NAND input/output latencies) due to, for example initialization and read and write operations, can impact system performance (e.g., desired system boot speed, lag).

While the first mode may have a first set of capabilities, a second mode in which the memory device operates following system boot complete at 420 may have one or more additional capabilities as well as (in addition to) the first set of capabilities. Moreover, in some examples, the first mode may have one or more capabilities that the second mode does not have. During system boot 425, one or more actions (e.g., operations) may be delayed until after the system boot is complete at 420. Such actions may include one or more initialization, read, or write operations.

In some examples of a delayed action, during system boot 425, the memory device may suspend, or delay until system boot complete 420, refreshing of a system component (e.g., a system block) of the memory device, or a mapping table component (e.g., a mapping table block) of the memory device, or both. The system component may comprise one or more NAND memory blocks that store firmware for the memory device. The mapping table component may comprise one or more NAND memory blocks that store a mapping table to translate logical addresses to physical addresses.

Additionally or alternatively, in some examples of a delayed action, the memory device may suspend or delay, refreshing a memory block. For example, the memory device may identify a block of the memory device that needs to be refreshed and, rather than perform the refresh at that time, may instead store an indication of the block (e.g., an address associated with the block), then refresh the block at the indicated address after system boot complete 420.

Additionally or alternatively, in some examples of a delayed action, the memory device may disable foreground garbage collection while operating according to the first mode. After system boot complete 420, the memory device may enable foreground garbage collection.

Additionally or alternatively, in some examples of a delayed action, the memory device may delay storing data generated during the system boot to MLC memory blocks (e.g., MLC NAND memory cells), and store such data to SLC memory blocks (e.g., SLC NAND memory cells) during system boot. After system boot complete 420, the memory device may store data to MLC memory blocks in the second mode. Additionally, the memory device may also store data in the SLC memory blocks in the second mode.

At system boot complete 420, corresponding to the end of the system boot 425, the host may transmit a command for the memory device to exit the first mode (e.g., a memory device first mode command 460), which may be received at the memory device input/output 410. The memory device may enter the second mode upon exiting the first mode (e.g., switch from operating in the first mode to operating in the second mode). Now operating in the second mode, one or more the delayed actions described may be performed, including actions corresponding to the one or more additional capabilities, for example, refreshing the system component, refreshing the mapping table component, refreshing a memory block, enabling and performing foreground garbage collection, or storing data to the MLC memory blocks, or a combination of these actions.

In some examples, the first mode includes capabilities that support the system boot procedure, and the second mode includes one or more additional capabilities that are not required to complete the system boot procedure.

After the system boot, the host device may launch an application 430. In service of application 430, the host device may transmit one or more read commands (e.g., memory device read command 450) and write commands (e.g., memory device write command 455), and the memory device may perform read and write operations in response while operating in the second mode.

The host device may additionally include at least one system idle period 435, and launch additional application 440, while operating in the second mode. During both periods, the memory device may perform memory read and write operations in response to read and write commands.

Figure 5:
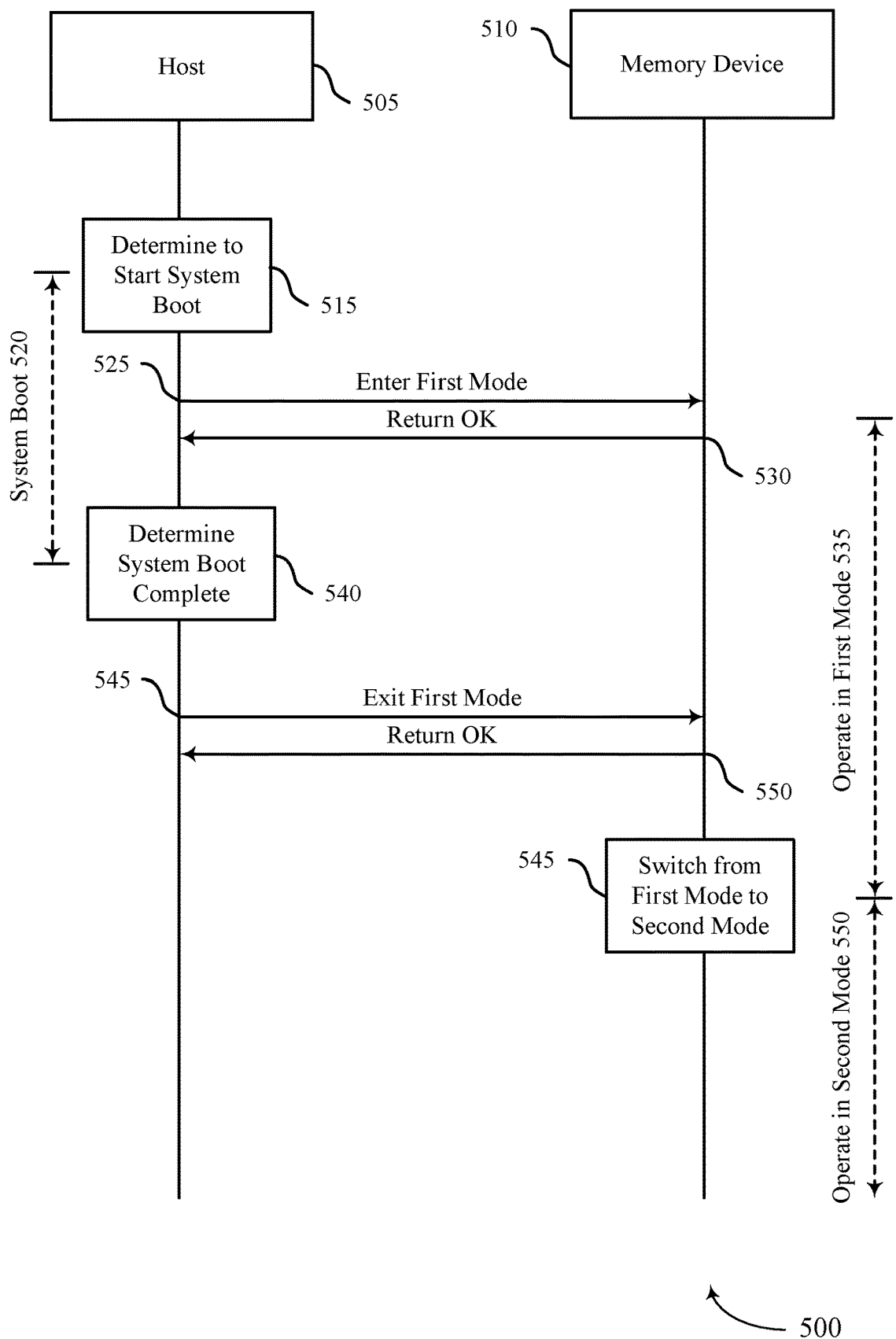
FIG. 5 illustrates an example of a flowchart for a process that supports a fast mode for a memory device in accordance with examples as disclosed herein.

FIG. 5 illustrates an example of a flowchart for a process 500 that supports a fast mode for a memory device in accordance with examples as disclosed herein. Host device 505 may be an example of a host device described herein, for example the host device may be or be part of host device 350, further described with reference to system 300. Memory device 510 may be an example of a memory device described herein, for example the memory device be, be part of, or include at least a portion of, memory device 100, NAND memory circuit 200, a memory device 320 of system 300, further described with reference to system 300, or a memory device operating according to process 400.

At 515, host device 505 may determine to start a system boot procedure 520. At 525 host device 505 may transmit a command 525 for memory device 510 to enter the first mode. At 530, memory device 510 may acknowledge the received command, and proceed at 535 to operate in the first mode for the system boot procedure 520, during which memory device 510 may perform certain operations further described herein for the system boot procedure 520. Memory device 510 may proceed to operate in the first mode at 535 before, after, or at substantially the same time as transmitting the acknowledgement at 520 to host device 505.

At 540, host device 505 may determine that the system boot procedure is complete and, at 545, transmit a command 545 for memory device 510 to exit the first mode. For example, host device 505 may determine that all critical procedure for system boot are complete. Additionally or alternatively, host device 505 may determine that host device 505 has reach a point in the system boot where the system can tolerate substantial memory device latencies (e.g., big managed NANAD input/output latencies), such that operation according to the first mode is no longer needed and/or desired. At 550, memory device 510 may acknowledge the received command, and proceed at 545 to switch from operating in the first mode to operating in the second mode, during which memory device 510 may perform one or more of the actions further described herein delayed during the system boot procedure 520. Memory device 510 may switch to operating in the second mode at 545 before, after, or at substantially the same time as transmitting the acknowledgement at 550 to host device 505.

Memory device 510 is shown as operating in the first mode during a system boot procedure 520. However, alternatively or additionally, host device 505 may at other times command memory device 510 to operate in the first mode. In some examples, host device 505 may send a command for the memory device 510 to enter the first mode, and memory device may then proceed to operate in the first mode until host device 505 transmits a command for the memory device 510 to exit the first mode, in response to which the memory device 510 may switch to operating in the second mode.

Figure 6:
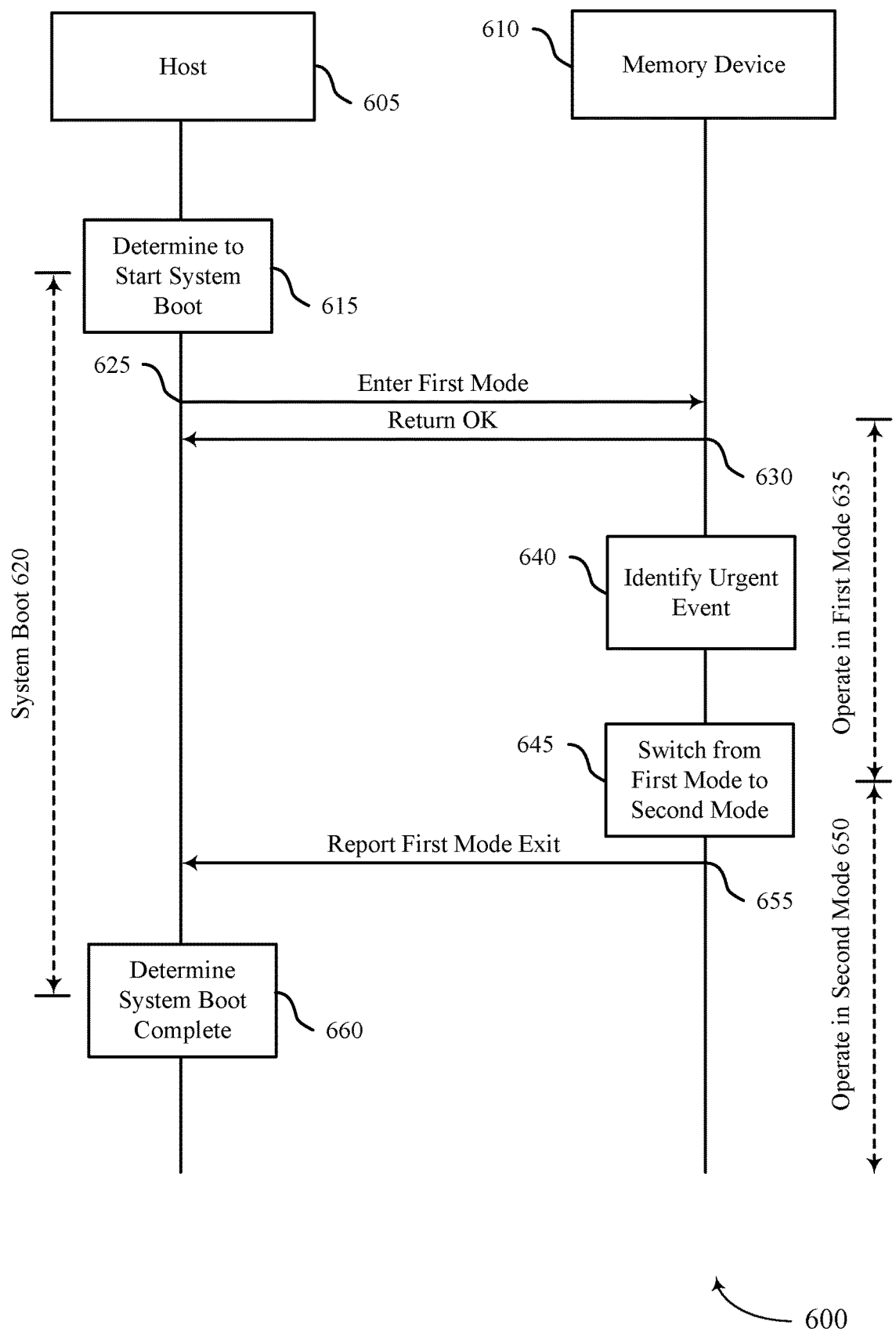
FIG. 6 illustrates an example of a flowchart for a process that supports a fast mode for a memory device in accordance with examples as disclosed herein.

FIG. 6 illustrates an example of a flowchart for a process 600 that supports a fast mode for a memory device in accordance with examples as disclosed herein. Host device 605 may be an example of a host device described herein, for example the host device may be or be part of host device 350, further described with reference to system 300. Memory device 610 may be an example of a memory device described herein, for example the memory device be, be part of, or include at least a portion of, memory device 100, NAND memory circuit 200, a memory device 320 of system 300, further described with reference to system 300, or a memory device operating according to process 400.

At 615, host device 605 may determine to start a system boot procedure 620. At 625 host device 605 may transmit a command 625 for memory device 610 to enter the first mode. At 630, memory device 610 may acknowledge the received command, and proceed at 635 to operate in the first mode for the system boot procedure 620, during which memory device 610 may perform certain operations further described herein for the system boot procedure 620. Memory device 610 may proceed to operate in the first mode at 635 before, after, or at substantially the same time as transmitting the acknowledgement at 620 to host device 605.

At 640, during system boot procedure 620 (e.g., during initialization), memory device 610 may detect an urgent event, triggering the memory device 610 to exit the first mode and proceed to operate in the second mode at 645 (e.g., switching from the first mode to the second mode). For example, memory device 610 may detect an absence or other unavailability of memory blocks in the memory device 610 that are available for writing, and switch to the second mode to allow for the capability to perform foreground garbage collection by memory device 610. In another example, memory device 610 may identify (e.g., detect) that a read error threshold has be satisfied (e.g., the threshold met or exceeded) and switch to the second mode to allow for additional read procedures. The urgent event may be defined by firmware of the memory device (e.g., managed NAND firmware). For example, firmware may store values for thresholds applicable to the parameters, such as the number of read errors that define when the threshold is satisfied. At 650, in response to switching from the first mode to the second mode at 645, the memory device 610 may operate in the second mode.

At 655, memory device 610 may report its exit from operation in the first mode. Memory device 610 may switch to operating in the second mode at 650 before, after, or at substantially the same time as transmitting the report at 655 to host device 605. Sometime thereafter, at 660, host device 605 may determine that the system boot has been completed, and memory device 610 may continue to operate in the second mode 650.

Figure 7:
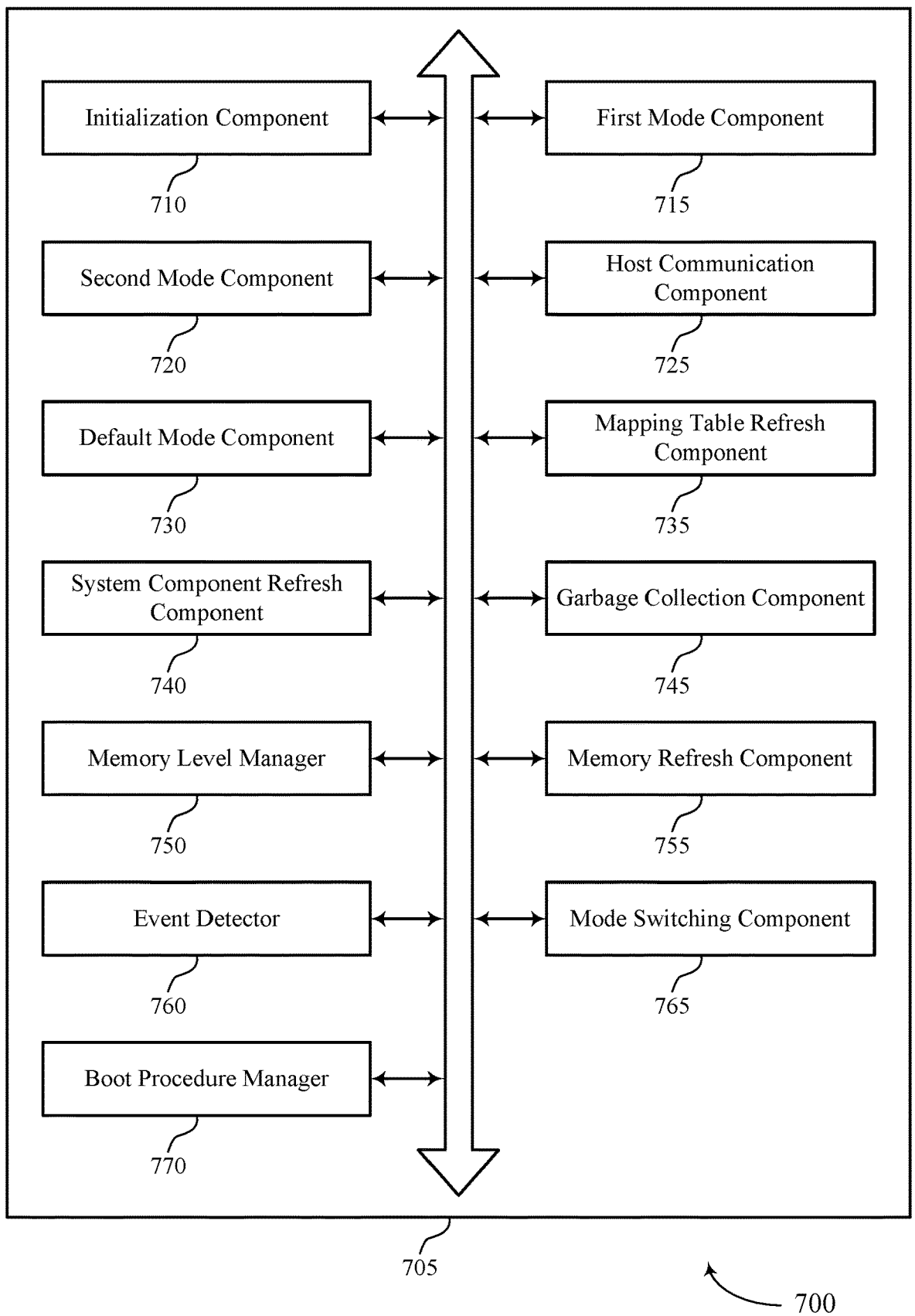
FIG. 7 shows a block diagram of a device that supports a fast mode for a memory device in accordance with aspects of the present disclosure.

FIG. 7 shows a block diagram 700 of a device 705 that supports a fast mode for a memory device in accordance with examples as disclosed herein. The device 705 may be an example of aspects of a device as described with reference to FIGS. 1 through 3, for example a local memory controller 345, a system memory controller 315, or host 350. The device 705 may include an initialization component 710, a first mode component 715, a second mode component 720, a host communication component 725, a default mode component 730, a mapping table refresh component 735, a system component refresh component 740, a garbage collection component 745, a memory level manager 750, a memory refresh component 755, an event detector 760, a mode switching component 765, and a boot procedure manager 770. Each of these modules may communicate, directly or indirectly, with one another (e.g., via one or more buses).

The initialization component 710 may identify an initialization of a memory device during a system boot procedure, the memory device supporting a first mode that includes a first set of capabilities and supporting a second mode that includes the first set of capabilities and one or more additional capabilities. In some examples, the initialization component 710 may determine to initialize a memory device during a system boot procedure for a system that includes the memory device, the memory device supporting a first mode that includes a first set of capabilities and supporting a second mode that includes the first set of capabilities and one or more additional capabilities. In some examples, the initialization component 710 may initiate a boot procedure for a system that includes a host device coupled with a memory device, where the memory device supports a first mode that includes a first set of capabilities and a second mode that includes the first set of capabilities and one or more additional capabilities.

The first mode component 715 may perform, based on the identifying, the initialization while operating the memory device according to the first mode, where operating the memory device according to the first mode includes delaying an action associated with the one or more additional capabilities. In some examples, operating, based on initiating the boot procedure, the memory device according to the first mode, where operating the memory device according to the first mode includes delaying an action associated with the one or more additional capabilities. In some examples, the first mode component 715 may determine to perform the initialization according to the first mode in response to the command.

The second mode component 720 may operate the memory device according to the second mode after the system boot procedure is complete, where operating the memory device according to the second mode includes performing the delayed action. In some examples, operating, based on completing the boot procedure, the memory device according to the second mode, where operating the memory device according to the second mode includes performing the delayed action.

The host communication component 725, for example as a part of a host, may transmit an initialization command to the memory device. In some cases, the initialization command includes a command for the memory device to operate in the first mode. In some examples, the host communication component 725 may receive, from the memory device, an acknowledgement of the command for the memory device to operate in the first mode.

In some examples, the host communication component 725 may transmit one or more read commands to the memory device during the system boot procedure.

In some examples, the host communication component 725 may transmit, to the memory device in response to the determining that the system boot procedure is complete, a command for the memory device to switch from operating in the first mode to the second mode. In some examples, the host communication component 725 may receive, from the memory device, an acknowledgement of the command to switch from operating in the first mode to the second mode.

In some examples, the host communication component 725, for example as part of a memory device, may receive a command for the memory device to exit the first mode. In some examples, the host communication component 725 may transmit an acknowledgement in response to the received command. In some examples, the host communication component 725 may transmit, based on the boot procedure being complete, an exit command for the first mode from the host device to the memory device, where operating the memory device according to the second mode is based on transmitting the exit command.

In some examples, the host communication component 725 may transmit, based on initiating the boot procedure, an enter command for the first mode from the host device to the memory device, where operating the memory device according to the first mode is based on transmitting the enter command. In some examples, the host communication component 725, for example as part of a memory device, may transmit an acknowledgement of the command to the host device.

The default mode component 730 may identify the first mode as a default mode for initializing the memory device. In some examples, the default mode component 730 may determine to perform the initialization according to the first mode based on identifying the first mode as the default mode.

The mapping table refresh component 735 may delay a refresh of a mapping table component of the memory device while operating according to the first mode.

The system component refresh component 740 may delay a refresh of a system component of the memory device while operating according to the first mode.

The garbage collection component 745 may disable foreground garbage collection for the memory device while operating according to the first mode.

The memory level manager 750 may store data in single-level not-and (NAND) memory cells of the memory device while performing the initialization, where delaying the action is based on storing the data to the single-level NAND memory cells. In some examples, the memory level manager 750 may store the data in multi-level NAND memory cells of the memory device after the system boot procedure is complete.

The memory refresh component 755 may identify a block of the memory device to be refreshed, store an indication of the identified block, and may refresh the block according to the stored indication after the system boot procedure is complete. In some examples, delaying the action is based on storing the indication, The event detector 760 may identify, during the system boot procedure, an absence of memory blocks in the memory device that are available for writing. In some examples, the event detector 760 may identify, during the system boot procedure, that a read error threshold has been satisfied.

The mode switching component 765 may switch the memory device to the second mode before the system boot procedure is complete based on identifying the absence of memory blocks. In some examples, the mode switching component 765 may switch the memory device to the second mode before the system boot procedure is complete based on identifying that the read error threshold has been satisfied. In some examples, the mode switching component 765 may switch the memory device from the first mode to the second mode based on receiving a command for the memory device to exit the first mode.

The boot procedure manager 770 may determine that the system boot procedure is complete. In some examples, the boot procedure manager 770 may determine, by the host device, that the boot procedure is complete.

Figure 8:
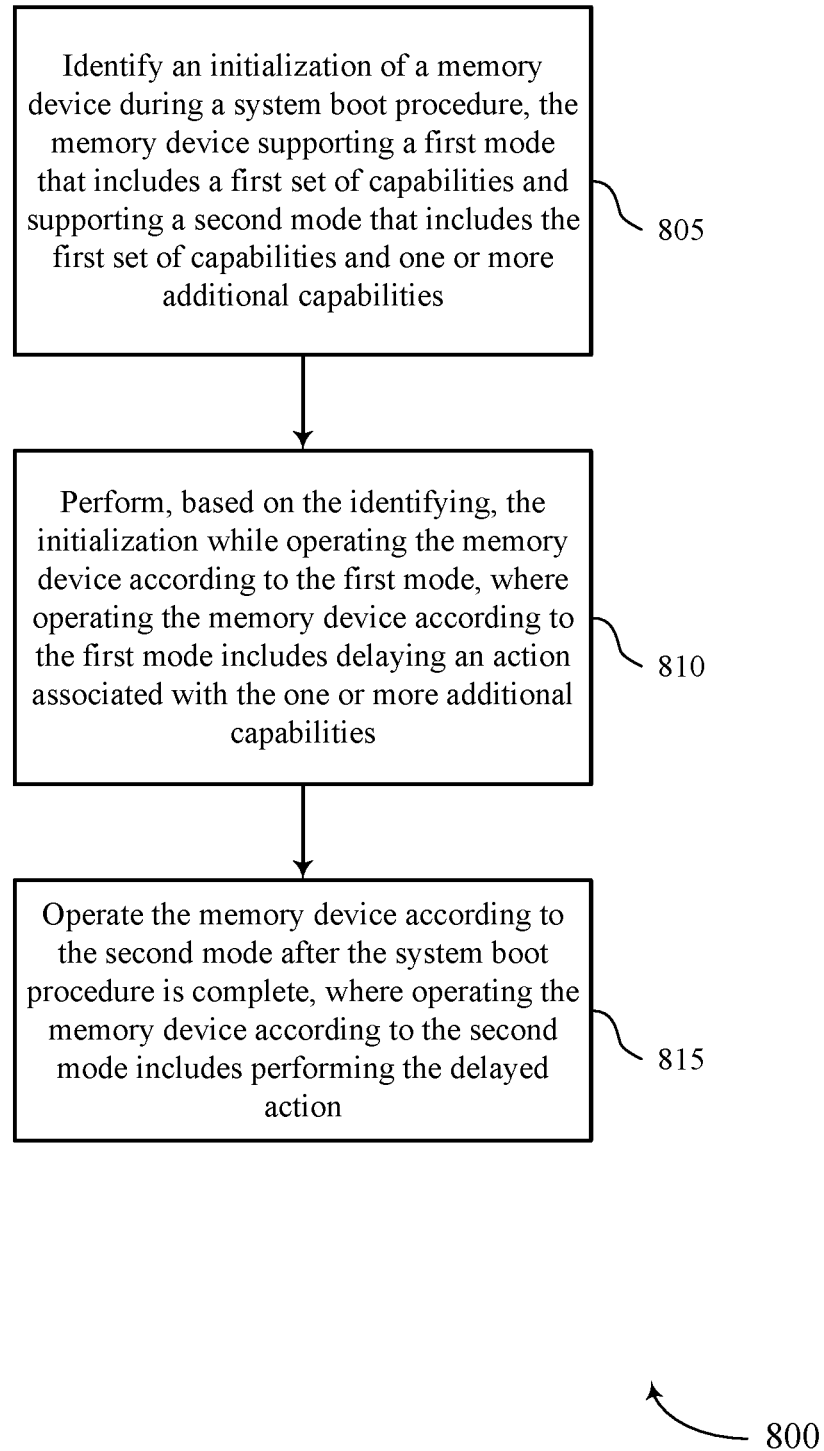
FIGS. 8 through 10 show flowcharts illustrating a method or methods that support fast mode for a memory device in accordance with examples as disclosed herein.

FIG. 8 shows a flowchart illustrating a method or methods 800 that supports a fast mode for a memory device in accordance with aspects of the present disclosure. The operations of method 800 may be implemented by a device, including a memory device, or its components as described herein. For example, the operations of method 800 may be performed by a device 705 as described with reference to FIG. 7. In some examples, one or more controllers, for example the system memory controller 315 as described with reference to FIG. 3, and/or a local memory controller 345 such as local memory controller 345-*a* as described with reference to FIG. 3, may execute a set of instructions to control the functional elements of the device, including the memory device, to perform the described functions. Additionally or alternatively, the one or more controllers may perform aspects of the described functions using special-purpose hardware.

At 805, the device, for example by the system memory controller 315 of device 305 or by a local memory controller 345 of memory device 320, or by a combination of system memory controller 315 and local memory controller 345, may identify an initialization of the memory device during a system boot procedure, the memory device supporting a first mode that includes a first set of capabilities and supporting a second mode that includes the first set of capabilities and one or more additional capabilities. The operations of 805 may be performed according to the methods described herein. In some examples, aspects of the operations of 805 may be performed by an initialization component as described with reference to FIG. 7.

At 810, the device, for example by the system memory controller 315 of device 305 or by a local memory controller 345 of memory device 320, or by a combination of system memory controller 315 and local memory controller 345, may perform, based on the identifying, the initialization while operating the memory device according to the first mode, where operating the memory device according to the first mode includes delaying an action associated with the one or more additional capabilities. The operations of 810 may be performed according to the methods described herein. In some examples, aspects of the operations of 810 may be performed by a first mode component as described with reference to FIG. 7.

At 815, the device, for example by the system memory controller 315 of device 305 or by a local memory controller 345 of memory device 320, or by a combination of system memory controller 315 and local memory controller 345, may operate the memory device according to the second mode after the system boot procedure is complete, where operating the memory device according to the second mode includes performing the delayed action. The operations of 815 may be performed according to the methods described herein. In some examples, aspects of the operations of 815 may be performed by a second mode component as described with reference to FIG. 7.

In some examples, an apparatus as described herein may perform a method or methods, such as the method 800. The apparatus may include features, means, or instructions (e.g., a non-transitory computer-readable medium storing instructions executable by a processor) for identifying an initialization of a memory device during a system boot procedure, the memory device supporting a first mode that includes a first set of capabilities and supporting a second mode that includes the first set of capabilities and one or more additional capabilities, performing, based on the identifying, the initialization while operating the memory device according to the first mode, where operating the memory device according to the first mode includes delaying an action associated with the one or more additional capabilities, and operating the memory device according to the second mode after the system boot procedure is complete, where operating the memory device according to the second mode includes performing the delayed action.

Some examples of the method 800 and the apparatus described herein may further include operations, features, means, or instructions for receiving a command for the memory device to enter the first mode for the initialization, and determining to perform the initialization according to the first mode in response to the command.

Some examples of the method 800 and the apparatus described herein may further include operations, features, means, or instructions for transmitting an acknowledgement of the command to the host device.

Some examples of the method 800 and the apparatus described herein may further include operations, features, means, or instructions for identifying the first mode as a default mode for initializing the memory device, and determining to perform the initialization according to the first mode based on identifying the first mode as the default mode.

In some examples of the method 800 and the apparatus described herein, delaying the action may include operations, features, means, or instructions for delaying a refresh of a mapping table component of the memory device while operating according to the first mode.

In some examples of the method 800 and the apparatus described herein, delaying the action may include operations, features, means, or instructions for delaying a refresh of a system component of the memory device while operating according to the first mode.

In some examples of the method 800 and the apparatus described herein, delaying the action may include operations, features, means, or instructions for disabling foreground garbage collection for the memory device while operating according to the first mode.

Some examples of the method 800 and the apparatus described herein may further include operations, features, means, or instructions for storing data in single-level not-and (NAND) memory cells of the memory device while performing the initialization, where delaying the action may be based on storing the data to the single-level NAND memory cells, and storing the data in multi-level NAND memory cells of the memory device after the system boot procedure may be complete.

Some examples of the method 800 and the apparatus described herein may further include operations, features, means, or instructions for identifying a block of the memory device to be refreshed, storing an indication of the identified block, where delaying the action may be based on storing the indication, and refreshing the block according to the stored indication after the system boot procedure may be complete.

Some examples of the method 800 and the apparatus described herein may further include operations, features, means, or instructions for identifying, during the system boot procedure, an absence of memory blocks in the memory device that may be available for writing, and switching the memory device to the second mode before the system boot procedure may be complete based on identifying the absence of memory blocks.

Some examples of the method 800 and the apparatus described herein may further include operations, features, means, or instructions for identifying, during the system boot procedure, that a read error threshold may have been satisfied, and switching the memory device to the second mode before the system boot procedure may be complete based on identifying that the read error threshold may have been satisfied.

Some examples of the method 800 and the apparatus described herein may further include operations, features, means, or instructions for receiving a command for the memory device to exit the first mode, switching the memory device from the first mode to the second mode based on the received command, and transmitting an acknowledgement in response to the received command.

Figure 9:
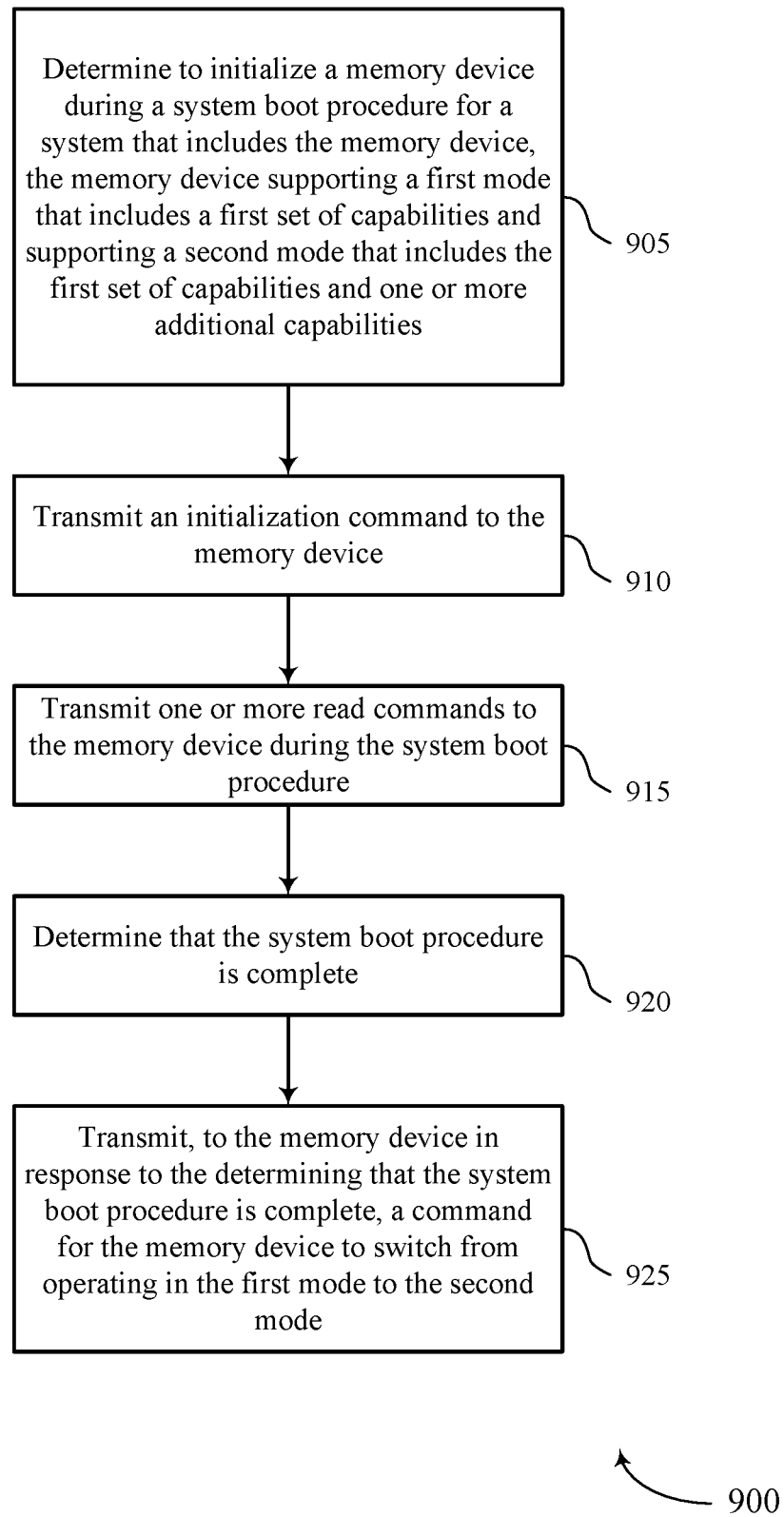

FIG. 9 shows a flowchart illustrating a method or methods 900 that supports a fast mode for a memory device in accordance with aspects of the present disclosure. The operations of method 900 may be implemented by a host device or its components as described herein. For example, the operations of method 900 may be performed by a host device 350 as described with reference to FIG. 3 or a device 705 as described with reference to FIG. 7. In some examples, a host device may execute a set of instructions to control the functional elements of the host device to perform the described functions. Additionally or alternatively, a host device may perform aspects of the described functions using special-purpose hardware.

At 905, the host device may determine to initialize a memory device during a system boot procedure for a system that includes the memory device, the memory device supporting a first mode that includes a first set of capabilities and supporting a second mode that includes the first set of capabilities and one or more additional capabilities. The operations of 905 may be performed according to the methods described herein. In some examples, aspects of the operations of 905 may be performed by an initialization component as described with reference to FIG. 7.

At 910, the host device may transmit an initialization command to the memory device. The operations of 910 may be performed according to the methods described herein. In some examples, aspects of the operations of 910 may be performed by a host communication component as described with reference to FIG. 7.

At 915, the host device may transmit one or more read commands to the memory device during the system boot procedure. The operations of 915 may be performed according to the methods described herein. In some examples, aspects of the operations of 915 may be performed by a host communication component as described with reference to FIG. 7.

At 920, the host device may determine that the system boot procedure is complete. The operations of 920 may be performed according to the methods described herein. In some examples, aspects of the operations of 920 may be performed by a boot procedure manager as described with reference to FIG. 7.

At 925, the host device may transmit, to the memory device in response to the determining that the system boot procedure is complete, a command for the memory device to switch from operating in the first mode to the second mode. The operations of 925 may be performed according to the methods described herein. In some examples, aspects of the operations of 925 may be performed by a host communication component as described with reference to FIG. 7.

In some examples, an apparatus as described herein may perform a method or methods, such as the method 900. The apparatus may include features, means, or instructions (e.g., a non-transitory computer-readable medium storing instructions executable by a processor) for determining to initialize a memory device during a system boot procedure for a system that includes the memory device, the memory device supporting a first mode that includes a first set of capabilities and supporting a second mode that includes the first set of capabilities and one or more additional capabilities, transmitting an initialization command to the memory device, transmitting one or more read commands to the memory device during the system boot procedure, determining that the system boot procedure is complete, and transmitting, to the memory device in response to the determining that the system boot procedure is complete, a command for the memory device to switch from operating in the first mode to the second mode.

In some examples of the method 900 and the apparatus described herein, the initialization command includes a command for the memory device to operate in the first mode. Some examples of the method 900 and the apparatus described herein may further include operations, features, means, or instructions for receiving, from the memory device, an acknowledgement of the command for the memory device to operate in the first mode.

Figure 10:
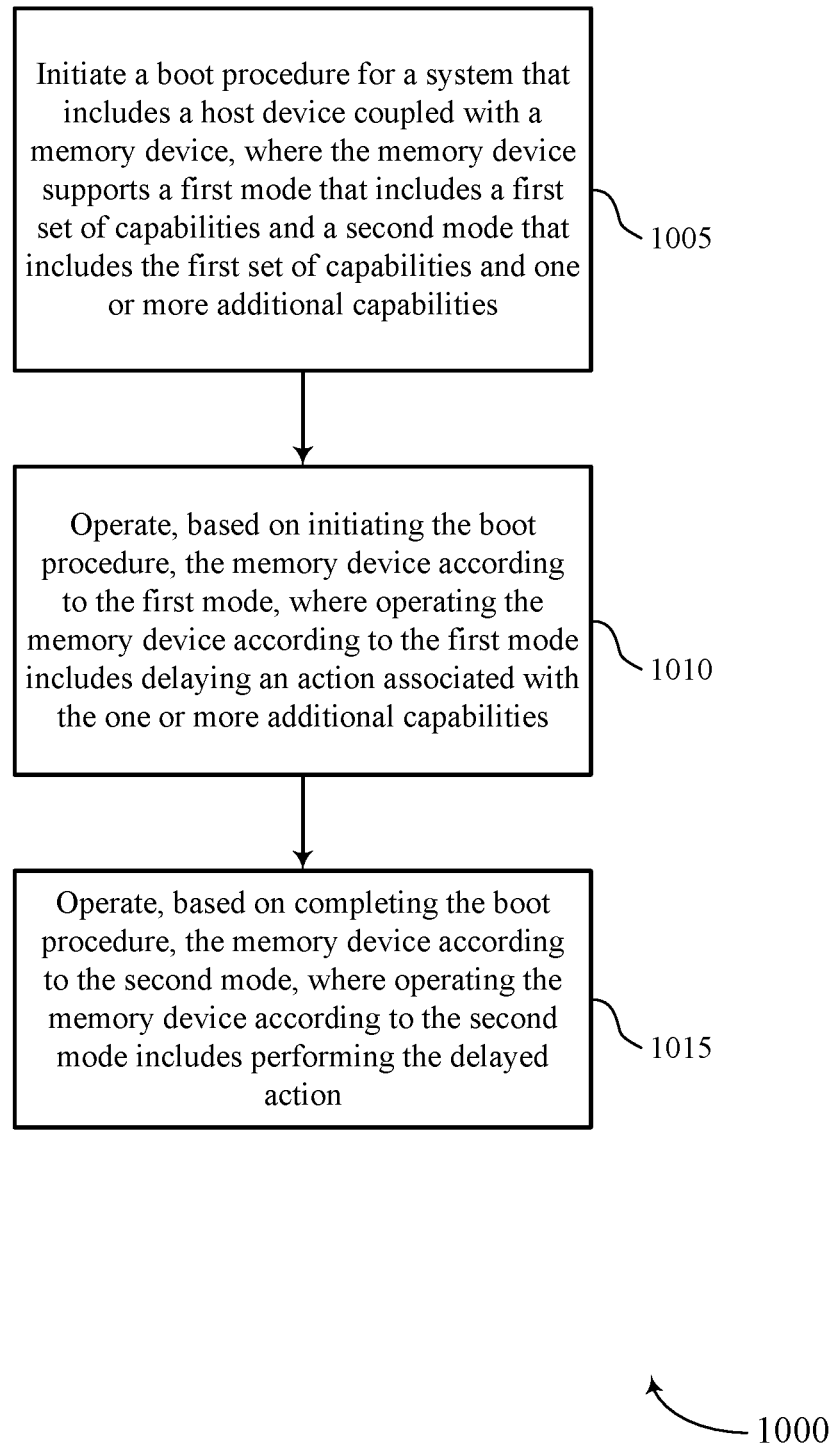

FIG. 10 shows a flowchart illustrating a method or methods 1000 that supports a fast mode for a memory device in accordance with aspects of the present disclosure. The operations of method 1000 may be implemented by a system including a memory device and host device, or their components as described herein. For example, the operations of method 1000 may be performed by a system including at least a device 305 and a host device 350 as described with reference to FIG. 3, a system including at least a memory device 510 and a host device 505 as described with reference to FIG. 5, a system including at least a memory device 610 and a host device 605 as described with reference to FIG. 6, or a system including at least a device 705 described with reference to FIG. 7. In some examples, a system including a memory device and host device may execute a set of instructions to control the functional elements of the system including a memory device and host device to perform the described functions. Additionally or alternatively, a system including a memory device and host device may perform aspects of the described functions using special-purpose hardware.

At 1005, the system may initiate a boot procedure for a system that includes a host device coupled with a memory device, where the memory device supports a first mode that includes a first set of capabilities and a second mode that includes the first set of capabilities and one or more additional capabilities. The operations of 1005 may be performed according to the methods described herein. In some examples, aspects of the operations of 1005 may be performed by an initialization component as described with reference to FIG. 7.

At 1010, the system may operate, based on initiating the boot procedure, the memory device according to the first mode, where operating the memory device according to the first mode includes delaying an action associated with the one or more additional capabilities. The operations of 1010 may be performed according to the methods described herein. In some examples, aspects of the operations of 1010 may be performed by a first mode component as described with reference to FIG. 7.

At 1015, the system may operate, based on completing the boot procedure, the memory device according to the second mode, where operating the memory device according to the second mode includes performing the delayed action. The operations of 1015 may be performed according to the methods described herein. In some examples, aspects of the operations of 1015 may be performed by a second mode component as described with reference to FIG. 7.

In some examples, an apparatus as described herein may perform a method or methods, such as the method 1000. The apparatus may include features, means, or instructions (e.g., a non-transitory computer-readable medium storing instructions executable by a processor) for initiating a boot procedure for a system that includes a host device coupled with a memory device, where the memory device supports a first mode that includes a first set of capabilities and a second mode that includes the first set of capabilities and one or more additional capabilities, operating, based on initiating the boot procedure, the memory device according to the first mode, where operating the memory device according to the first mode includes delaying an action associated with the one or more additional capabilities, and operating, based on completing the boot procedure, the memory device according to the second mode, where operating the memory device according to the second mode includes performing the delayed action.

Some examples of the method 1000 and the apparatus described herein may further include operations, features, means, or instructions for transmitting, based on initiating the boot procedure, an enter command for the first mode from the host device to the memory device, where operating the memory device according to the first mode may be based on transmitting the enter command, determining, by the host device, that the boot procedure may be complete, and transmitting, based on the boot procedure being complete, an exit command for the first mode from the host device to the memory device, where operating the memory device according to the second mode may be based on transmitting the exit command.

It should be noted that the methods described herein are possible implementations, and that the operations and the steps may be rearranged or otherwise modified and that other implementations are possible. Furthermore, portions from two or more of the methods may be combined.

An apparatus is described. The apparatus may include not-and (NAND) memory cells and a memory controller coupled with the NAND memory cells and operable to cause the apparatus to initialize the apparatus during a system boot procedure, the apparatus supporting a first mode that includes a first set of capabilities and a second mode that includes the first set of capabilities and one or more additional capabilities, operate the apparatus according to the first mode after initializing the apparatus, where operating the apparatus according to the first mode includes delaying an action associated with the one or more additional capabilities, and operate the apparatus according to the second mode after the system boot procedure is complete, where operating the apparatus according to the second mode includes performing the delayed action.

Some examples of the apparatus may include a mapping table component coupled with the memory controller and operable to map logical memory addresses to physical memory addresses, where the delayed action includes a refresh operation for the mapping table component to the NAND memory cells.

Some examples of the apparatus may include a system component coupled with the memory controller and operable to store firmware for the apparatus, where the delayed action includes a refresh operation for the system component.

In some examples, the delayed action includes a garbage collection procedure for the NAND memory cells.

Some examples may further include identifying a block of the NAND memory cells to be refreshed, store an indication of the identified block, where delaying the action may be based on storing the indication, and delay the action based on refreshing the block according to the stored indication after the system boot procedure may be complete.

Some examples may further include identifying, during the system boot procedure, an absence of blocks of the NAND memory cells in the apparatus that may be available for writing, and switch the apparatus to the second mode before the system boot procedure may be complete based on identifying the absence of blocks of the NAND memory cells that may be available for writing.

Some examples may further include identifying, during the system boot procedure, that a read error threshold may have been satisfied, and switch the apparatus to the second mode before the system boot procedure may be complete based on identifying that the read error threshold may have been satisfied.

In some examples, the NAND memory cells include single-level NAND memory cells and multi-level NAND memory cells, and the memory controller may be further operable to cause the apparatus to.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0 V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0 V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "layer" used herein refers to a stratum or sheet of a geometrical structure. Each layer may have three dimensions (e.g., height, width, and depth) and may cover at least a portion of a surface. For example, a layer may be a three-dimensional structure where two dimensions are greater than a third, e.g., a thin-film. Layers may include different elements, components, and/or materials. In some cases, one layer may be composed of two or more sublayers. In some of the appended figures, two dimensions of a three-dimensional layer are depicted for purposes of illustration.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   identifying an initialization of a memory device during a system boot procedure, the memory device supporting a first mode that includes a first set of capabilities and supporting a second mode that includes the first set of capabilities and one or more additional capabilities;
   performing, based at least in part on the identifying, the initialization while operating the memory device according to the first mode, wherein operating the memory device according to the first mode comprises delaying an action associated with the one or more additional capabilities; and
   operating the memory device according to the second mode after the system boot procedure is complete, wherein operating the memory device according to the second mode comprises performing the delayed action.

2. The method of claim 1, further comprising:
   receiving a command for the memory device to enter the first mode for the initialization; and
   determining to perform the initialization according to the first mode in response to the command.

3. The method of claim 2, wherein the command for the memory device to enter the first mode is received from a host device, the method further comprising:
   transmitting an acknowledgement of the command to the host device.

4. The method of claim 1, further comprising:
   identifying the first mode as a default mode for initializing the memory device; and
   determining to perform the initialization according to the first mode based at least in part on identifying the first mode as the default mode.

5. The method of claim 1, wherein delaying the action comprises:
   delaying a refresh of a mapping table component of the memory device while operating according to the first mode.

6. The method of claim 1, wherein delaying the action comprises:
   delaying a refresh of a system component of the memory device while operating according to the first mode.

7. The method of claim 1, wherein delaying the action comprises:
   disabling foreground garbage collection for the memory device while operating according to the first mode.

8. The method of claim 1, further comprising:
   storing data in single-level not-and (NAND) memory cells of the memory device while performing the initialization, wherein delaying the action is based at least in part on storing the data to the single-level NAND memory cells; and storing the data in multi-level NAND memory cells of the memory device after the system boot procedure is complete.

9. The method of claim 1, further comprising:
identifying a block of the memory device to be refreshed;
storing an indication of the identified block, wherein delaying the action is based at least in part on storing the indication; and
refreshing the block according to the stored indication after the system boot procedure is complete.

10. The method of claim 1, further comprising:
identifying, during the system boot procedure, an absence of memory blocks in the memory device that are available for writing; and
switching the memory device to the second mode before the system boot procedure is complete based at least in part on identifying the absence of memory blocks.

11. The method of claim 1, further comprising:
identifying, during the system boot procedure, that a read error threshold has been satisfied; and
switching the memory device to the second mode before the system boot procedure is complete based at least in part on identifying that the read error threshold has been satisfied.

12. The method of claim 1, further comprising:
receiving a command for the memory device to exit the first mode;
switching the memory device from the first mode to the second mode based at least in part on the received command; and
transmitting an acknowledgement in response to the received command.

13. An apparatus, comprising:
not-and (NAND) memory cells; and
a memory controller coupled with the NAND memory cells and operable to cause the apparatus to:
  initialize the apparatus during a system boot procedure, the apparatus supporting a first mode that includes a first set of capabilities and a second mode that includes the first set of capabilities and one or more additional capabilities;
  operate the apparatus according to the first mode after initializing the apparatus, wherein operating the apparatus according to the first mode comprises delaying an action associated with the one or more additional capabilities; and
  operate the apparatus according to the second mode after the system boot procedure is complete, wherein operating the apparatus according to the second mode comprises performing the delayed action.

14. The apparatus of claim 13, further comprising:
a mapping table component coupled with the memory controller and operable to map logical memory addresses to physical memory addresses, wherein the delayed action comprises a refresh operation for the mapping table component to the NAND memory cells.

15. The apparatus of claim 13, further comprising:
a system component coupled with the memory controller and operable to store firmware for the apparatus, wherein the delayed action comprises a refresh operation for the system component.

16. The apparatus of claim 13, wherein the delayed action comprises a garbage collection procedure for the NAND memory cells.

17. The apparatus of claim 13, wherein the memory controller is further operable to cause the apparatus to:
identify a block of the NAND memory cells to be refreshed;
store an indication of the identified block, wherein delaying the action is based at least in part on storing the indication; and
delay the action based at least in part on refreshing the block according to the stored indication after the system boot procedure is complete.

18. The apparatus of claim 13, wherein the memory controller is further operable to cause the apparatus to:
identify, during the system boot procedure, an absence of blocks of the NAND memory cells in the apparatus that are available for writing; and
switch the apparatus to the second mode before the system boot procedure is complete based at least in part on identifying the absence of blocks of the NAND memory cells that are available for writing.

19. The apparatus of claim 13, wherein the memory controller is further operable to cause the apparatus to:
identify, during the system boot procedure, that a read error threshold has been satisfied; and
switch the apparatus to the second mode before the system boot procedure is complete based at least in part on identifying that the read error threshold has been satisfied.

20. The apparatus of claim 13, wherein:
the NAND memory cells comprise single-level NAND memory cells and multi-level NAND memory cells;
the memory controller is further operable to cause the apparatus to;
store data in the single-level NAND memory cells while operating in the first mode, wherein delaying the action is based at least in part on storing the data in the single-level NAND memory cells; and
copy the data to the multi-level NAND memory cells after switching to the second mode.

21. A method, comprising:
determining to initialize a memory device during a system boot procedure for a system that includes the memory device, the memory device supporting a first mode that includes a first set of capabilities and supporting a second mode that includes the first set of capabilities and one or more additional capabilities;
transmitting an initialization command to the memory device;
transmitting one or more read commands to the memory device during the system boot procedure;
determining that the system boot procedure is complete; and
transmitting, to the memory device in response to the determining that the system boot procedure is complete, a command for the memory device to switch from operating in the first mode to the second mode.

22. The method of claim 21, wherein the initialization command comprises a command for the memory device to operate in the first mode.

23. The method of claim 22, further comprising:
receiving, from the memory device, an acknowledgement of the command for the memory device to operate in the first mode.

24. A method, comprising:
initiating a boot procedure for a system that includes a host device coupled with a memory device, wherein the memory device supports a first mode that includes a first set of capabilities and a second mode that includes the first set of capabilities and one or more additional capabilities;

operating, based at least in part on initiating the boot procedure, the memory device according to the first mode, wherein operating the memory device according to the first mode comprises delaying an action associated with the one or more additional capabilities; and operating, based at least in part on completing the boot procedure, the memory device according to the second mode, wherein operating the memory device according to the second mode comprises performing the delayed action.

25. The method of claim 24, further comprising:

transmitting, based at least in part on initiating the boot procedure, an enter command for the first mode from the host device to the memory device, wherein operating the memory device according to the first mode is based at least in part on transmitting the enter command;

determining, by the host device, that the boot procedure is complete; and transmitting, based at least in part on the boot procedure being complete, an exit command for the first mode from the host device to the memory device, wherein operating the memory device according to the second mode is based at least in part on transmitting the exit command.

* * * * *